United States Patent Office 3,100,722
Patented Aug. 13, 1963

3,100,722
LINEAR POLYESTER FILMS HAVING SURFACES SUITABLE FOR WRITING THEREON
Otto Herrmann and Hermann Müller, Wiesbaden, and Markus Seibel, Mainz, Germany, assignors, by mesne assignments, to Keuffel & Esser Co., Hoboken, N.J.
No Drawing. Filed Mar. 1, 1960, Ser. No. 11,957
Claims priority, application Germany Mar. 3, 1959
11 Claims. (Cl. 117—138.8)

The present invention relates to films and sheetings of plastics having surfaces suited for writing and drawing thereon. More particularly, the invention is concerned with films and sheetings of linear polyesters which have been matted superficially for the purpose of making the polyester surface receptive to ink and other writing and drawing material.

Films of plastics that are to be used as a writing material must meet many demands. In the first line, they must possess a very good dimensional stability, even during longer storage at varying degrees of air humidity and of temperature. Further, it is of importance that they lie flat and absorb as little humidity as possible. So far, films of linear polyesters have been best suited for meeting these demands. They have the additional advantages of high tear-resistance and good storability.

Due to their chemical fastness to solvents, films of linear polyesters can be coated only with difficulty for the purpose of making layers which adhere firmly to the films, e.g. matted layers which are required for the use of the polyester films as writing materials. Moreover, it should be possible to erase a writing on the film and to write again on the erased area.

Hitherto, films of linear polyesters which were intended for use as writing materials have been mechanically matted, e.g. by sandblasting. However, the matting thus obtained met only partially the high demands expected of such writing material. In particular, the mechanically matted films are not easy to erase and the erased areas do not readily lend themselves to new writing.

Now the object of the present invention are linear polyester films with a matted surface suitable for writing, which films have an exceptional dimensional stability, can be stored for a long time without undergoing any changes, and, in particular, meet the demands with regard to the specific qualities of a writing material. In accordance with the present invention, the films of linear polyesters suitable for writing are characterized by surface layers consisting of polymeric terephthalic acid mixed esters, said layers containing glass powder of a grain size below $30\mu$.

In connection with the present invention, the expression "polymeric terephthalic acid mixed esters" is meant to designate co-polyesters which are obtained by esterification and polycondensation of mixtures of acids containing terephthalic acid and at least one further dicarboxylic acid, e.g. isophthalic acid, ortho-phthalic acid, adipic acid, or sebacic acid, with bivalent alcohols containing up to 10 carbon atoms in the molecule. Alcohols of this kind are e.g.: ethyleneglycol, trimethyleneglycol, tetramethyleneglycol, pentamethyleneglycol, hexamethyleneglycol, heptamethyleneglycol, decamethyleneglycol, and propyleneglycol. The polymeric terephthalic acid mixed esters to be used in accordance with the invention are well known. Excellent results are obtained when using mixed esters obtained from mixtures of acids containing per 100 mols of terephthalic acid 10 to 50 mols of said other dicarboxylic acid.

For the preparation of the matted surface layers which are suitable for writing thereon on linear polyester films according to this invention, the polyterephthalic acid mixed esters are dissolved in organic solvents, e.g. methylene chloride, chloroform, 1.1.2-trichloroethane, or in mixtures of such solvents. After intimately mixing the solutions with the fine glass powder, so that the powder is evenly distributed in the solutions, they are coated in known manner onto the linear polyester films. Subsequently, the solvents are removed from the coatings. In order to achieve a very high degree of adhesion of the matted layers to the linear polyester films, it is advantageous to heat the coated films, after removal of the solvent, to temperatures lying above the softening range of the respective layer applied, i.e. to temperatures ranging between 120 and 220° C. The polyterephthalic acid mixed ester solutions used for preparing the surface layers of the present invention are advantageously applied in such quantities as to produce, upon drying, surface layers which have a thickness of from 5 to $30\mu$.

It has proved to be of advantage that the polymeric terephthalic acid mixed ester solutions containing glass powder which are to be used according to the present invention for the preparation of the surface layers, are coated onto the linear polyester films by way of a lacquering process under reflux conditions. The polyester films are passed at low speed through the solution of the polyterephthalic acid mixed ester, any excess of the solution being returned by reflux. The quality of the coating obtained depends on the speed of advance of the linear polyester film and the viscosity of the polyterephthalic acid mixed ester solution.

Further, it has been found that matted layers according to the present invention may also be obtained by using, instead of or in admixture with glass powder, other substances in a most finely divided state, such as silicon dioxide, e.g. in the form of kieselguhr or quartz powder, aluminum oxide, e.g. in the form of emery dust, titanium dioxide, silicon carbide, talcum or chalk.

For the preparation of the terephthalic acid mixed ester solutions any solvent may be used in which the mixed esters to be used according to the present invention dissolve. In some cases, it may be of advantage to use solvent mixtures containing, as diluting media, solvents of higher boiling points. These higher boiling solvents, which must not necessarily be solvents for the polymeric terephthalic acid mixed esters, serve to reduce the speed of evaporation of the coating applied to the film.

The finely divided glass powder, or equivalent substances, may be present in the layer in proportions ranging from 30 to 70 percent by weight, based on the weight of the mixed ester contained in the layer, the most suitable proportions being from 50 to 60 percent.

Occasionally, the solutions of the polyterephthalic acid mixed esters undergo an undesirable change of viscosity when left standing. Such changes in viscosity can be substantially prevented by adding small quantities of most finely pulverized potassium phosphate to the solutions.

The linearpolyester films to be coated with the surface layers according to the present invention are advantageously pre-treated with a so-called primer or coupling agent, i.e. substances capable of improving the adhesion of a coated-on layer to the respective base support. Such primers are frequently used in the processing of plastics and well-known to the expert. In the present invention, consideration is mainly given to such primers as thin coatings of poly-functional isocyanates, e.g. hexamethylene diisocyanate, toluylene diisocyanate, and the polyisocyanates commercially available under the trade mark "Desmodur."

The following examples are inserted in order to further illustrate the present invention without any intention to limit it to what is disclosed in the examples.

Example I

In 70 parts by weight of chloroform, there are dissolved 10 parts by weight of a polymeric linear mixed ester obtained from a mixture consisting of 70 parts by weight of terephthalic acid and 30 parts by weight of isophthalic acid and an equivalent quantity of ethylene glycol.

6 parts by weight of glass powder of a grain size up to 5 $\mu$ are suspended, with intimate mixing, in 20 parts by weight of chloroform.

The glass powder suspension is added, with stirring, to the solution of the polymeric mixed ester, and the mixture thus obtained is cast onto a 75 $\mu$ thick longitudinally and transversally stretched, heat-set film of a linear polyester obtained by polycondensation of terephthalic acid and ethylene glycol. Drying is performed at 60° C. The coating composition is applied in such quantities that the dried coating has a thickness of about 20 $\mu$. After removal of the chloroform, the coated film is heated for 10 seconds at 190° C. and then cooled down. The coated film thus obtained readily accepts signs written thereon by pencil and the signs are easily removable by erasure.

Equally good results are obtained, if, instead of chloroform, a 1:1 mixture of 1.1.2-trichloroethane and chloroform is used and the process is otherwise performed as stated above. In this case, drying is performed at 100–110° C.

Example II

In 60 parts by weight of chloroform there are dissolved 5 parts by weight of a polymeric mixed ester obtained from ethyleneglycol and a 3:7 mixture of isophthalic acid and terephthalic acid.

In 35 parts by weight of chloroform there are suspended 3 parts by weight of glass powder of a particle size not exceeding 5 $\mu$ and 0.05 part by weight of most finely pulverized potassium phosphate. Solution and suspension are combined and thoroughly agitated until a homogeneous mixture is obtained.

From a casting device, the above described composition is cast onto a 100 $\mu$ thick, biaxially stretched and heat-set linear terephthalic acid/ethylene glycol polyester film. Working speed of the machine is 0.6 m./min. After evaporation of the solvent, the coated film is after-heated to 180° C. The coating composition is applied in such a quantity that the dry coat has a thickness of 15 $\mu$. A very homogeneous matted layer is obtained which readily accepts writing.

What we claim is:

1. A sheet material for receiving marks on the surface thereof comprising a linear polyester base film with a coating superimposed thereon, said coating including a finely powdered abrasive material of a size in the order of the thickness of the coating and a polymerized mixture of terephthalic, a dicarboxylic acid and a dihydroxyalcohol providing an exposed surface on the coating which readily receives marks and permits erasure of the marks without damage to the surface of the coating.

2. The invention according to claim 1 in which the dicarboxylic acid is selected from the group consisting of isophthalic acid, orthophthalic acid, adipic acid and sebasic acid.

3. Sheet material for receiving marks which may be erased on the surface thereof comprising a linear polyethylene-terephthalate base film with a coating superimposed thereon, said coating including an abrasive pigment of a size in the order of 5 to 30 $\mu$ polymerized mixed esters of terephthalic acid, dicarboxylic acid and dihydroxyalcohol providing an exposed mark receiving surface on the coating which readily receives marks and permits erasure and replacement of other marks in the erased areas.

4. The invention according to claim 3 in which the dicarboxylic acid is selected from the group consisting of isophthalic acid, orthophthalic acid, adipic acid and sebasic acid.

5. A new article of manufacture comprising a base of a biaxially stretched and heat-set film of polyethylene terephthalate and a coating thereon of a copolyester made by esterification and polycondensation of a mixture of terephthalic acid, a dicarboxylic acid and a dihydroxy alcohol having up to 10 carbon atoms, said copolyester coating containing in uniform distribution an inorganic abrasive material including essentially such substance selected from the group consisting of silicon dioxide, aluminum oxide, titanium oxide, silicon carbide, talcum, chalk and glass, said substance having an average particle size below 30 $\mu$.

6. The invention according to claim 5 in which the dicarboxylic acid is selected from the group consisting of isophthalic acid, orthophthalic acid, adipic acid and sebasic acid.

7. The article of manufacture of claim 5, wherein said copolyester is an ethylene glycol mixed polyester of terephthalic and isophthalic acid, and said substance is glasspowder.

8. The process of coating a film of a linear polyester which comprises dissolving a polymeric terephthalic acid mixed ester comprising terephthalic acid, another dicarboxylic acid selected from the group consisting of isophthalic acid, orthophthalic acid, adipic acid and sebasic acid and a dihydroxy alcohol having up to ten carbon atoms in an organic solvent, joining said solution with a suspension of glass powder of an average particle size below 30 $\mu$ in an organic solvent compatible with the solvent present in said solution, intimately mixing said mixture, applying the mixture to the surface of the linear polyester film, drying the coating and heating the dry coated film to a temperature range of 120–220° C.

9. The process of making a surface of a biaxially stretched and heat-set film of polyethylene terephthalate receptive to pencil-markings which process comprises: coating said surface with a solution of a polyester made by esterification and polycondensation of a mixture of terephthalic acid, a dicarboxylic acid, and a dihydroxy alcohol having up to 10 carbon atoms, in an organic solvent, and drying said coating, said solution having suspended in itself an inorganic abrasive material including essentially such substance selected from the group consisting of silicon dioxide, aluminum oxide, titanium oxide, silicon carbide, talcum, chalk and glass, said abrasive material having an average particle size below 30 $\mu$.

10. The invention according to claim 9 in which the dicarboxylic acid is selected from the group consisting of isophthalic acid, orthophthalic acid, adipic acid and sebasic acid.

11. A drawing material comprising a base film of biaxially stretched dimensionally stable polyethylene terephthalate and a coating thereon of a copolyester from the polycondensation mixture of terephthalic acid, another dicarboxylic acid selected from the group consisting of isophthalic acid, orthophthalic acid, adipic and sebasic acid and a dihydroxy alcohol having up to 10 carbon atoms therein with an inorganic abrasive material therein and with said coating effectively bonded to the base film, said abrasive being of a size to be retained in said coating and said coating being of a thickness to provide for the abrasive to project sufficiently so that marking lines can be applied directly on said coating and be erased therefrom.

References Cited in the file of this patent

UNITED STATES PATENTS

| | | |
|---|---|---|
| 2,537,114 | Young et al. | Jan. 9, 1951 |
| 2,720,500 | Cody | Oct. 11, 1955 |
| 2,785,087 | Franar et al. | Mar. 12, 1957 |
| 2,890,144 | Robitschek | June 9, 1959 |
| 2,955,364 | Shaw et al. | Oct. 11, 1960 |
| 2,999,016 | Beeber et al. | Sept. 5, 1961 |

UNITED STATES PATENT OFFICE
CERTIFICATE OF CORRECTION

Patent No. 3,100,722                          August 13, 1963

Otto Herrmann et al.

It is hereby certified that error appears in the above numbered patent requiring correction and that the said Letters Patent should read as corrected below.

Column 3, lines 54 and 55, after "terephthalic" insert -- acid --.

Signed and sealed this 4th day of February 1964.

(SEAL)
Attest:
ERNEST W. SWIDER

Attesting Officer

EDWIN L. REYNOLDS

Acting Commissioner of Patents